United States Patent [19]

Carden

[11] Patent Number: 4,829,768
[45] Date of Patent: May 16, 1989

[54] FLUID DISSOCIATION SOLAR ENERGY COLLECTION SYSTEM

[75] Inventor: Peter O. Carden, Canberra, Australia

[73] Assignee: Anutech Pty Ltd., Canberra, Australia

[21] Appl. No.: 10,129

[22] PCT Filed: May 6, 1986

[86] PCT No.: PCT/AU86/00130

§ 371 Date: Jan. 5, 1987

§ 102(e) Date: Jan. 5, 1987

[87] PCT Pub. No.: WO86/06820

PCT Pub. Date: Nov. 20, 1986

[30] Foreign Application Priority Data

May 6, 1985 [AU] Australia ............................ PH00440

[51] Int. Cl.⁴ ............................................. F01K 25/06
[52] U.S. Cl. ................................... 60/673; 60/641.15; 60/649
[58] Field of Search ...................... 60/641.9, 649, 673, 60/641.8, 641.15

[56] References Cited

U.S. PATENT DOCUMENTS 4,304,993 12/1981 Carden ........................... 250/203 R

FOREIGN PATENT DOCUMENTS 495395 4/1977 Australia .
3135487 3/1983 Fed. Rep. of Germany ........ 60/673

OTHER PUBLICATIONS

"Work Recovery Efficiency of Ideal Gas Thermochemical Energy Transfer Systems and SO₃ Synthesis", May 1980, P. O. Carden.
"The Efficiencies of Thermochemical Energy Transfer", Energy Research vol. 2, 389–406 (1978).
"Thermochemical Energy Transport Costs For A Distributed Solar Power Plant", Solar Energy, vol. 20, pp. 333–342 (1978).
"Ammonia Thermochemical Energy Transport in a Distributed Collector Solar Thermal Power Plant", Solar Energy, vol. 27, No. 3, pp. 205–214 (1981).
"Energy Storage Efficiency For The Ammonia/Hydrogen–Nitrogen Thermochemical Energy Transfer System", Energy Research vol. 3, pp. 29–40 (1979).

Primary Examiner—Stephen F. Husar
Attorney, Agent, or Firm—Fleit, Jacobson, Cohn & Price

[57] ABSTRACT

A solar energy collection system utilizing a fluid, e.g. ammonia, which dissociates endothermically and recombines exothermically and in which work output is obtained directly from the thermochemical fluid stream by expanding the fluid through turbines subsequent to the endothermic reaction. Undissociated fluid is introduced at an elevated temperature into an absorber-reaction vessel which is exposed to solar radiation and subsequently the dissociated fluid is conducted from the vessel to expansion turbines and through a counterflow heat exchanger to allow cooling. A second reaction chamber effects partial recombination of the dissociated products and a separator separates the undissociated and dissociated fluids with the undissociated fluid being returned via the heat exchanger where it is heated prior to entry to the absorber-reaction vessel.

2 Claims, 5 Drawing Sheets

Direct work recovery, high pressure fluid lines. The quantities shown are relative mass flows.

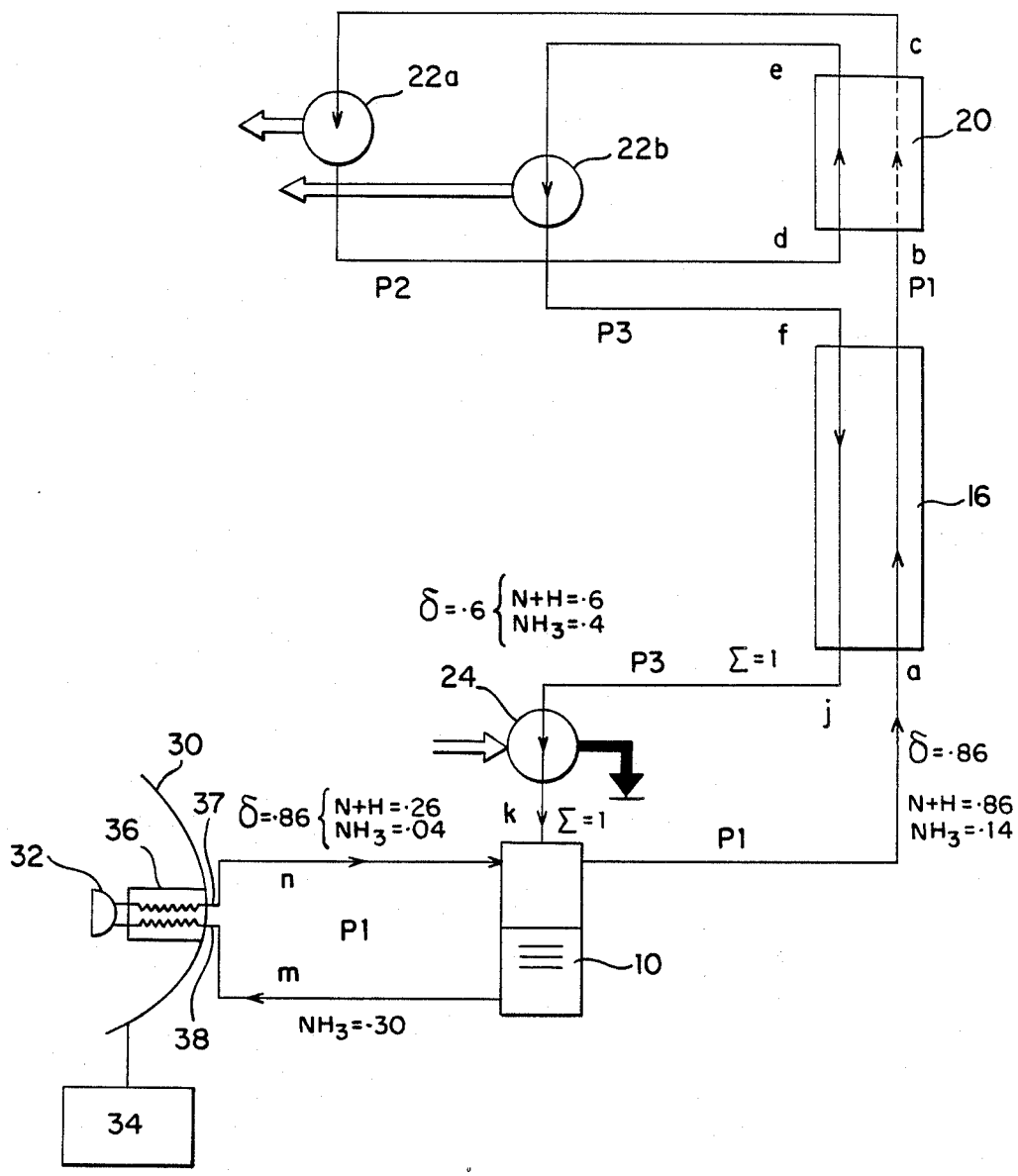
FIG. 1    Direct work recovery, high pressure fluid lines. The quantities shown are relative mass flows.

FLUID DISSOCIATION SOLAR ENERGY COLLECTION SYSTEM

FIELD OF THE INVENTION

This invention relates to improvements in methods and means for collecting solar radiation. In particular the invention is concerned with a system which uses a fluid which dissociates endothermically and recombines exothermically.

BACKGROUND OF THE INVENTION

Prior art methods of collecting and gathering solar energy over large areas of land include the following:

(1) Solar energy is collected by hot plate absorbers in which solar energy is converted to heat. The heat either boils a liquid or raises the temperature of a fluids, and by corradiating in either case this hot fluid, energy is brought to a common heat recovery plant.

(2) Solar energy is collected by means of parabolic or paraboloidal mirrors and is converted to heat in a focal absorber in which either the temperature of a fluid is raised or a liquid is boiled. In either case the hot fluid is corradiated as in 1.

(3) Solar energy is collected by flat mirrors or near flat mirrors by means of which the radiant energy is redirected to a common focal absorber usually elevated. The heat energy is recovered from the absorber by means of a heat exchanging fluid.

In Australian Patent Specification No. 495395, and in U.S. Pat. No. 4,304,993 which corresponds thereto, there is disclosed a solar energy collection system in which a fluid dissociates endothermically and subsequently recombines exothermically into an undissociated fluid, comprising:

(a) means for introducing the undissociated fluid, at elevated temperature, into an absorber-reaction vessel, (b) means for focussing solar radiation onto the absorber-reaction vessel, (c) means operable from a master control for controlling the orientation of the means for focussing solar radiation, (d) means for conducting the fluid from the absorber-reaction vessel through a first counterflow heat exchanger to effect cooling, (e) means for conducting the fluid to a reaction chamber wherein partial recombining of the dissociated products occurs with release of heat energy, (f) a separator for separating undissociated fluid and dissociated fluid, (g) means for returning dissociated fluid to the reaction chamber, (h) means for returning undissociated fluid to the first heat exchanger so as to heat it prior to entry into the absorber-reaction vessel, (i) means for maintaining the fluid at superatmospheric pressure, (j) means for recovering heat energy from the reaction chamber.

In the above context, a fluid which dissociates is a fluid a component of which undergoes dissociation into simpler constituents, the whole, however, remaining fluid. The simpler constituents subsequently recombine to form the undissociated fluid having the same composition as the original fluid.

More recently research workers at The Australian National University, Canberra, Australia, have published several articles relating to developments in thermochemical energy transfer—

Carden, P. O. (1981). Energy Conversion Technical Report No. 23, Department of Engineering Physics, The Australian National University, Canberra, Australia.

Carden, P. O. and Williams, O. M. (1978). Int. J. Energy Research 2, 389–406.

Williams, O. M. (1978). Solar Energy 20, 333–342.

Williams, O. M. (1981). Solar Energy 27, 205–214.

Williams, O. M. and Carden, P. O. (1979). Int. J. Energy Research 3, 29–40.

SUMMARY OF THE INVENTION

A disadvantage of the system described in our earlier patent is that the fluid lines external to the synthesis terminal line operate at uneconomically high pressures—that is, pressures which are so high that pipe lines have to meet design standards which cause engineering and economic problems—suitable materials are costly, walls have to be thick and joint problems are encountered. As a result of the thickness of the walls of the absorbers necessitated by the high pressures, heat transfer problems occurred.

Furthermore, the reaction kinetics of dissociation are not favoured by high pressures (although synthesis is).

In the existing system inefficiencies arose due to the need for conducting the heat from the synthesiser into the working fluid of a conventional heat engine i.e. a steam engine.

The objects of the present invention are to overcome the aforesaid disadvantages.

It has been discovered that we improve our existing system by taking work directly from the product stream by expansion turbines instead of extracting sensible heat by conduction. Of course, other expanders could perform the same function as expansion turbines.

The present invention involves a new concept whereby the work output is obtained directly from the thermochemical fluid stream by the use of turbines and conversion of the entire exothermic terminal is effected into a heat engine, the rejected waste heat of which is the heat dissipated by the isothermal compressor. Compared to turbines used conventionally for gas and steam, the turnbines for direct work recovery operate with quite dense fluids because they do not exhaust to atmospheric or sub atmospheric pressure. Consequently they are unusually compact and can operate at higher speed if this is desirable so as to further reduce size.

Thus the present invention concerns an improvement or modification of the invention of our Australian Pat. No. 495395 and U.S. Pat. No. 4,304,993, the disclosures of which are incorporated by cross-reference.

In both the present invention and the previous invention of U.S. Pat. No. 4,304,993, it is convenient to group components according to their primary functions. In practice the means for conveying cooled dissociated fluid from the heat exchanger that is associated with the absorber-reactor vessel is a pipeline at or near ambient temperature.

Moreover, the means for introducing undissociated fluid, at ambient temperature, to this heat exchanger is a second pipeline at ambient temperature.

Both of these ambient temperature pipelines together with other connected ambient temperature pipelines serving other absorber-reactor vessels form an entity which conveniently provides a boundary to, and thus defines a group of components comprising all those components through which fluid may pass to or from the exothermic (or synthesis) reactor vessel without entering either of the aforesaid ambient temperature pipelines. This group of components is conveniently referred to as the exothermic terminal.

BRIEF DESCRIPTION OF THE DRAWINGS

Further details of this invention may be understood by reference to the accompanying drawings in which the above-described ambient temperature pipelines are indicated by section labels m and n and wherein:

FIG. 1 illustrates an exothermic terminal in accordance with the present invention;

DETAILED DESCRIPTION OF THE DRAWINGS

Figure 1A:
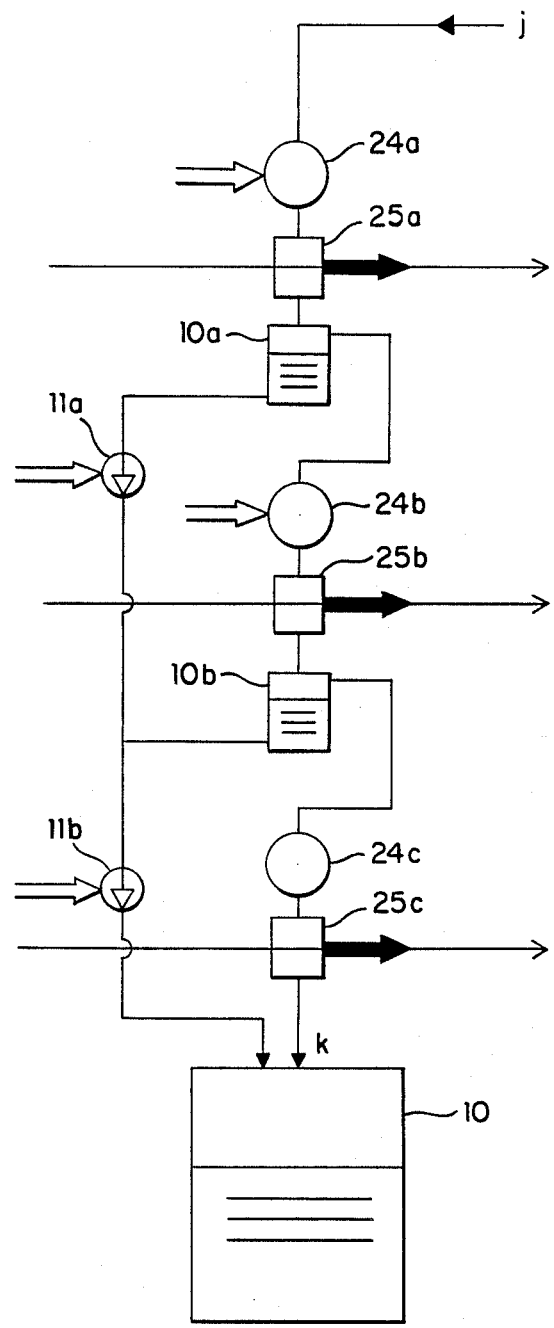
FIG. 1A shows the details of a compressor system useful in the exothermic terminal of FIG. 1.

In FIGS. 1, 1A, 2, 3 and 3A components of the plant and equipment are shown joined by pipelines. Some points of these pipelines are labelled a to r as an aid to the description below. In each case, the label is intended to apply to an entire section of pipeline, each such section being bounded on either side of the labelled point by entry to or exit from another component of the plant or by a point at which branching of pipelines occurs. The aforesaid labels are referred to henceforth as section labels. In addition, pipelines are labelled with P1, P2 and P3 to indicate the relative pressures within them, P1 being significantly greater than P2 which in turn is significantly greater than P3. Indicative values of reaction extent at points in the circuit are shown as values of the parameter 5.

In the Figures, unfilled arrows represent work applied to or obtained from a component of the plant and filled arrows represent heat flowing into or out of a component of the plant. In either case, the direction of flow of energy is represented by the direction of the arrow.

Also shown on these Figures at some points in the circuit are the relative flow rates of certain components of the fluid mixtures. These relative flow rates are expressed as a proportion of the flow rate of fluid at section j, all flow rates being expressed in kilograms per second. Each of the aforesaid relative flow rates is shown in Figures equated to a symbol which identifies the corresponding aforesaid component in accordance with the following key:

| COMPONENT | | SYMBOL |
|---|---|---|
| Nitrogen and hydrogen | represented by | N + H |
| Ammonia | represented by | $NH_3$ |
| Nitrogen, hydrogen and ammonia | represented by | $\Sigma$ |

Turning to FIG. 1, there is shown a system comprising an absorber-reaction vessel 32, solar radiation focusing means 30, orientation control means 34 for controlling the orientation of the solar radiation focusing means 30, heat exchanger 36, fluid lines 37 and 38, separator 10, heat exchanger 16, reaction chamber 20, expanders 22a and 22b, and compressor system 24.

The compressor of system 24 is preferably multistage, for example, one having three stages as depicted in FIG. 1a. Section labels j and k in FIG. 1a correspond to section labels j and k in FIG. 1. FIG. 1A shows in detail the structure or arrangement of compressor system 24. Turning now to FIG. 1A, components 24a, 24b and 24c are individual stages of a compressor; 25a and 25b are interstage coolers and 25c is an after cooler. All of these coolers are supplied with ambient temperature cooling water. If two phases are involved, as in the case of the ammonia system, the products from each interstage cooler and after cooler will include a liquid condensate. This must be removed by passing the products into separators 10a, 10b and 10, vessels large enough to allow the liquid to settle out. The liquid from separators 10a and 10b is compressed by pumps 11a and 11b. The gas from separators 10a and 10b is used in each case as the feed for the next stage of compression.

Figure 2:
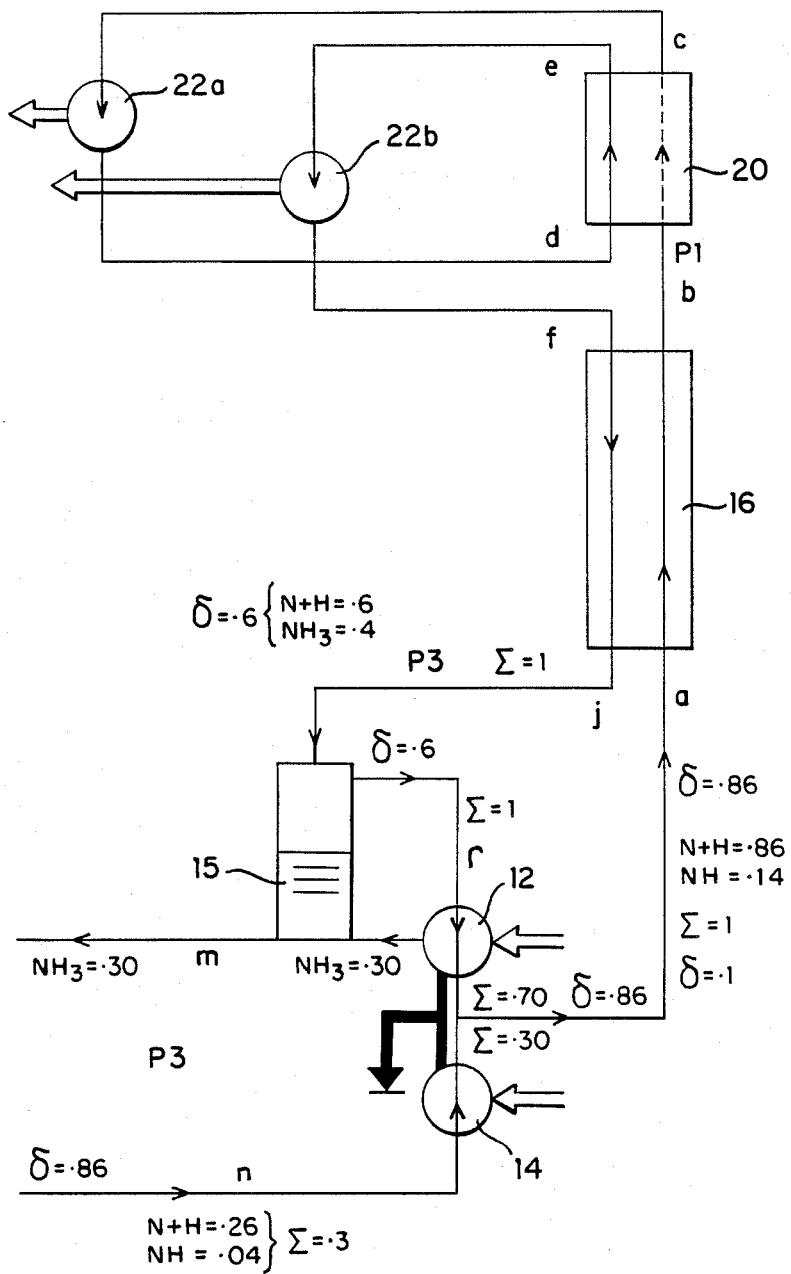
FIGS. 2 and 3 illustrate modified embodiments of the exothermic terminal of FIG. 1.
Figure 3:
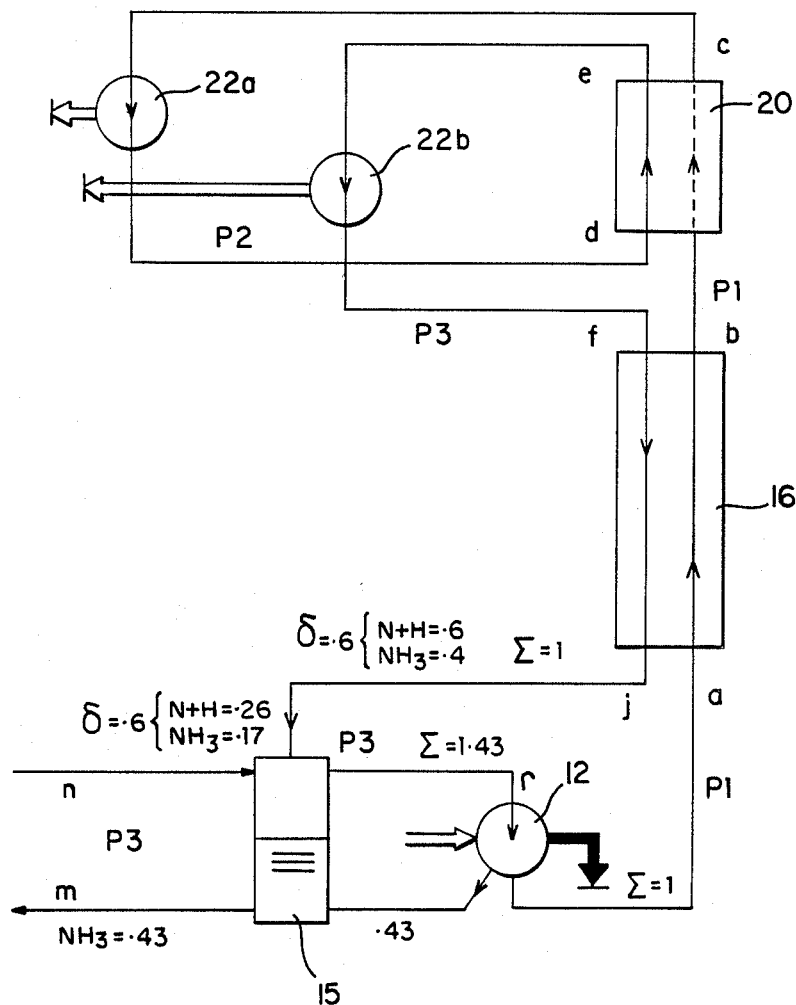

For the configuration of FIG. 1 and the modifications shown in FIGS. 2 and 3, the use of a multiplicity of stages in the compressor system ensurres that compression is practically isothermal. Also an additional feature is that each stage of compression tends to be smaller than its predecessor because the quantity of gas fed to the stages is successively reduced. An important practical criterion is that condensation must not occur within any of the compressor stages since high speed droplets may cause damage. The fluid property relevant to this criterion is $\Delta Sd/\Delta P$, the ratio of the increase in dew point entropy to the corresponding increase in pressure, using the saturated fluid state at the input to the compression stage as reference. It is impossible for condensate to form if $\Delta Sd/\Delta P$ is negative or zero. This is the case for the ammonia system since over the entire regime of interest $\Delta Sd/\Delta P$ is negative (of the order of $-1E-5$ Kcal/K.Atm.Mole$NH_3$).

FIGS. 2 and 3 show how the configuration of FIG. 1 can be modified to allow for the operation of the fluid lines 37 and 38, absorber reaction vessel 32 and heat exchanger 36 at the lowest pressure P3. This has certain advantages (as detailed in the section on trade-offs). The configuraton of FIG. 2 shows a compressor system 12 and compressor 14 in parallel, 12 being for saturated vapor and 14 for the dry gas resulting from fairly complete dissociation at absorber-reactor 32. Also shown is separator 15. This arrangement allows maximum utilization of the fluid lines 37 and 38 because little of the ammonia is returned from absorber-reactor 32 undissociated. It also offers high efficiency since thermodynamic losses due to mixing saturated and unsaturated vapors are avoided.

In the configuration of FIG. 3 dissociation is less complete. Ideally the mixture returning from absorber-reactor 32 corresponds (in physical and chemical analysis) to the stream at j emerging from the cool side of the heat exchanger 16 (saturated vapor at ambient temperature). The two streams are joined and compressed with the one compressor system 12 there being no mixing loss. The main advantage of this scheme is that the amount of dissociation catalyst is further reduced because of incomplete dissociation whilst high efficiency is maintained. Again 15 is a separator.

Figure 3A:
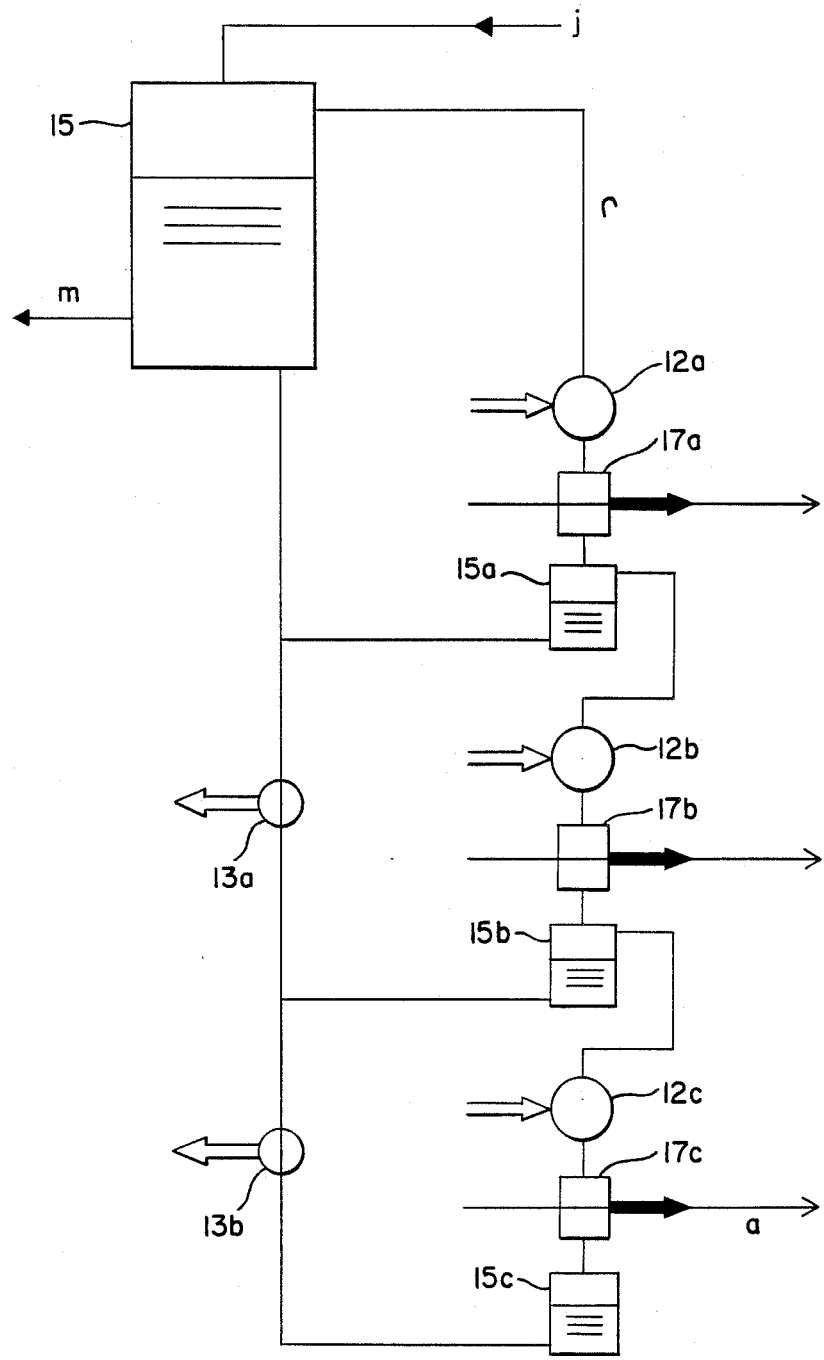
FIG. 3A shows the details of a compressor system useful in an exothermic terminal of FIG. 2 or 3.

FIG. 3A shows in detail the compressor system 12 of either FIG. 2 or FIG. 3. The section labels a, m and r in FIG. 3A correspond to the same section labels of FIGS. 2 and 3. Turning now to FIG. 3A, components 12a, 12b and 12c are individual stages of a compressor; 17a and 17b are interstage coolers and 17c is an after cooler. All of these coolers are supplied with ambient temperature cooling water. If two phases are involved, as in the case of the ammonia system, the products from each interstage and after cooler will include a liquid condensate. This must be removed by passing the products into separators 15a, 15b and 15c, vessels large enough to allow the liquid to settle out. The liquid is then decompressed for example by hydraulic motors 13a and 13b. The gas from separators 15a and 15b is used in each case as the feed for the next stage of compression.

In neither of the arrangements shown in FIGS. 2 and 3 are the reaction extents shown for the fluid immediately after dissociation mandatory. Both arrangements are tolerant of fairly wide variations in reaction extent.

What is claimed:

1. A solar energy collection system wherein a fluid dissociates endothermically and subsequently recombines exothermically into an undissociated fluid, comprising:
    (a) means for introducing an undissociated fluid, at an elevated temperature, into an absorber-reaction vessel,
    (b) means for focussing solar radiation onto the absorber-reaction vessel,
    (c) means operable from a master control for controlling the orientation of the means for focussing solar radiation,
    (d) means for conducting the fluid from the absorber-reaction vessel through a first counterflow heat exchanger to effect cooling,
    (e) means for conducting the cooled fluid to a separator for separating the cooled fluid into an undissociated fluid component and a dissociated fluid stream,
    (f) means for conducting the dissociated fluid stream to a reaction chamber wherein partial recombining of dissociated products in disassociated fluid stream occurs with release of heat energy,
    (g) means for conducting the dissociated fluid stream to expansion means to obtain work output directly therefrom;
    (h) means for returning the dissociated fluid stream to the separator,
    (i) means for returning undissociated fluid from the separator to the first heat exchanger so as to heat the undissociated fluid prior to entry into the absorber-reaction vessel,
    (j) means for maintaining the fluid stream at superatmospheric pressure.

2. A solar energy collection system of claim 1 wherein the undissociated fluid consists essentially of ammonia.

* * * * *